Oct. 31, 1950     G. R. BRENT     2,527,524
MOTOR VEHICLE SPRING SUSPENSION
Filed June 9, 1947
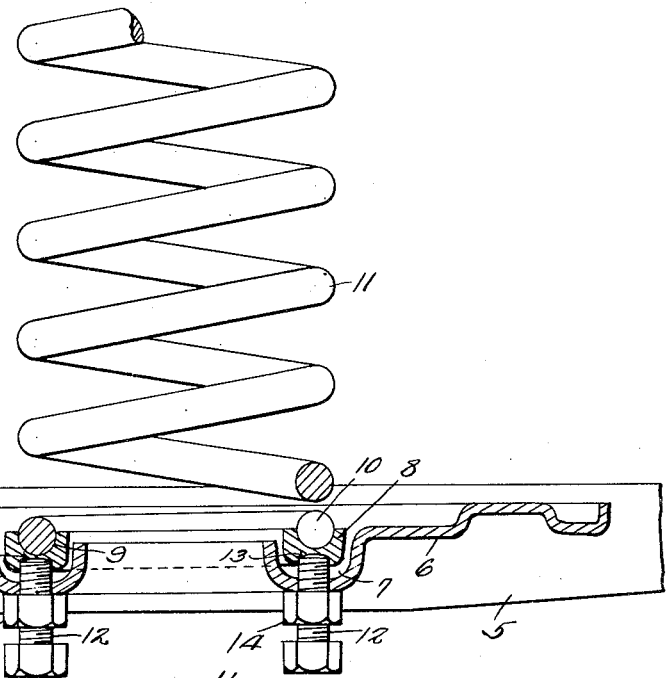
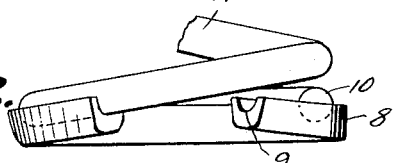
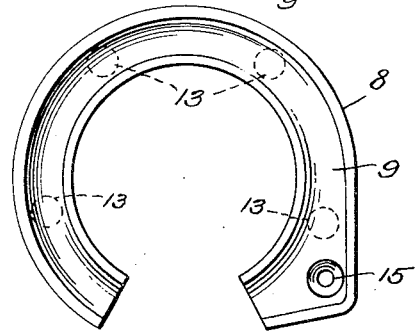
Inventor
G. R. Brent
By A. A. Snow & Co.
Attorneys Patented Oct. 31, 1950

2,527,524

UNITED STATES PATENT OFFICE 2,527,524

MOTOR VEHICLE SPRING SUSPENSION

George R. Brent, Beaumont, Tex.

Application June 9, 1947, Serial No. 753,581

2 Claims. (Cl. 267—60)

This invention relates to vehicle chassis construction, and more particularly to the means for supporting the usual coil springs used between the wheels and frame of the vehicle, and now in common use.

An important object of the invention is to adjust the springs to regulate the tension thereof, so that accurate alignment of the wheels may be insured at all times, thereby reducing wear on the bearings and tires to the minimum.

Another important object of the invention is to provide a device of this character which is in the form of an attachment that can be readily and easily positioned within the usual recessed spring-supporting plate of the chassis construction.

Still another object of the invention is to support the attachment in such a way that it may be readily and easily adjusted to regulate the tension of the spring supported thereby.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1 is an elevational view illustrating one of the bars of the chassis of the vehicle, and illustrating the spring-supporting plate equipped with the attachment forming the subject matter of the present invention, the plate and attachment being shown in section.

Figure 2 is an elevational view illustrating the attachment, and showing one end of a coiled spring as positioned therein.

Figure 3 is a plan view of the attachment.

Referring to the drawing in detail, the reference character 5 indicates one of the bars of the chassis of a motor vehicle, which is supplied with the usual spring-supporting plate indicated generally by the reference character 6, the spring-supporting plate having the usual annular recess 7 in which the attachment or spacer 8 is disposed.

This spacer 8 is substantially circular in formation, and is so designed that it will fit loosely within the recess 7, as clearly shown by the drawing.

The spacer is formed with an annular groove 9 in the upper surface thereof, the construction of the groove 9 being such that it will accommodate the lower coil 10 of the spring mounted therein, and which in the present showing is indicated by the reference character 11.

Threaded openings are formed in the spring-supporting plate 6, the threaded openings being spaced apart for the reception of the adjusting bolts 12 which are four in number, although it is to be understood that the number of bolts may be varied, to meet the various requirements of use.

As clearly shown by the drawing, the inner ends of the bolts 12 rest in recesses 13 which are formed in the lower surface of the spacer 8, the recesses being of sizes to receive the inner ends of the bolts with a close fit.

Lock nuts are provided on the bolts 12 and are moved into abutting relation with respect to the bottom of the plate 6, to lock the bolts 12 in their adjusted positions.

From the foregoing, it will be seen that due to the construction shown and described, I have provided a spacer in which the lower end of a coiled spring is held, so that by adjusting the bolts 12, the spacer may be raised or lowered to adjust the tension of the spring supported therein.

While I have shown and described the spacer as used on the lower end of the spring, it is to be understood that the spacer may be used at the opposite end of the spring, and it is contemplated to use the spacer at this end of the spring in a great many cases, to insure the proper adjustment of the spring supported therebetween.

Reference character 15 indicates a drain hole in the spacer that communicates with the annular groove 9 thereof, to allow moisture to pass therefrom.

From the foregoing it is believed that due to the construction shown and described, the construction and operation of the attachment will be apparent, and that further description as to its use is unnecessary.

What is claimed is:

1. The combination with the coiled spring-supporting plate of a motor vehicle having a recess, and a coil spring mounted within the recess, of a spacer member having a groove in which an end coil of the coiled vehicle supporting spring is held, fitted in the recess of the supporting plate, said supporting plate having threaded openings, bolts threaded in said openings and engaging said spacer moving the spacer vertically, tensioning the spring, and lock nuts mounted on the bolts engaging the supporting plate securing the bolts in their adjusted positions.

2. The combination with the coiled spring-supporting plate of a motor vehicle, having a recess, and threaded openings disposed in the recess and a coil spring mounted therein, of a spacer member having a groove in which an end coil of the spring is held, said spacer member having recesses in the lower surface thereof, adjusting bolts threaded in the openings of the supporting plate and having their inner ends engaging within the recesses of the spacer member, whereby said spacer member is adjusted vertically.

GEORGE R. BRENT.

REFERENCES CITED

The following references are of record in the file of this patent:

UNITED STATES PATENTS

| Number | Name | Date |
|---|---|---|
| 2,193,473 | Boyer | Mar. 12, 1940 |